(12) United States Patent
Barabas

(10) Patent No.: US 11,934,198 B2
(45) Date of Patent: Mar. 19, 2024

(54) SYSTEMS AND METHODS FOR AUTONOMOUS VEHICLE OPERATION

(71) Applicant: 6 River Systems, LLC, Waltham, MA (US)

(72) Inventor: James Barabas, Concord, MA (US)

(73) Assignee: 6 River Systems, LLC, Waltham, MA (US)

(*) Notice: Subject to any disclaimer, the term of this patent is extended or adjusted under 35 U.S.C. 154(b) by 0 days.

(21) Appl. No.: 17/198,691

(22) Filed: Mar. 11, 2021

(65) Prior Publication Data

US 2022/0291694 A1  Sep. 15, 2022

(51) Int. Cl.
*G05D 1/02* (2020.01)
*B60W 50/00* (2006.01)
(Continued)

(52) U.S. Cl.
CPC ....... *G05D 1/0276* (2013.01); *B60W 50/0098* (2013.01); *B60W 50/0205* (2013.01);
(Continued)

(58) Field of Classification Search
CPC .. G05D 1/0276; G05D 1/0214; G05D 1/0231; G05D 2201/0206; G05D 2201/0211; G05D 2201/0216; B60W 50/0098; B60W 50/0205; B60W 50/029; B60W 2555/20; B60W 2556/65; B60W 2050/0083; B60W 2050/0215
See application file for complete search history.

(56) References Cited

U.S. PATENT DOCUMENTS 5,946,605 A * 8/1999 Takahisa ............... H04H 20/28
                                                    455/150.1
9,834,380 B2  12/2017 Hamilton et al.
(Continued)

FOREIGN PATENT DOCUMENTS

DE   102012008846   11/2012
EP       3686864    7/2020

OTHER PUBLICATIONS

European Patent Office, "Extended European Search Report," issued in connection with European Patent Application No. 21192682.9, dated Mar. 24, 2022, 5 pages.
(Continued)

*Primary Examiner* — Jeff A Burke
*Assistant Examiner* — Mohamad O El Sayah
(74) *Attorney, Agent, or Firm* — Hanley, Flight & Zimmerman, LLC

(57) ABSTRACT

Disclosed herein are systems and methods for autonomous vehicle operation, in which a processor is configured to receive sensor data collected by a first sensor of a first autonomous vehicle during navigation of the first autonomous vehicle through a particular location and prior to a control signal subsequently generated by a controller of the first autonomous vehicle; determine based on the sensor data an event that triggered the control signal. A communication device coupled to the processor is configured to transmit to a second autonomous vehicle an instruction, based on the determined event, to adjust sensor data collected by a second sensor of the second autonomous vehicle during navigation of the second autonomous vehicle in the particular location.

20 Claims, 8 Drawing Sheets

(51) Int. Cl.
  *B60W 50/02* (2012.01)
  *B60W 50/029* (2012.01)
  *G05D 1/00* (2006.01)

(52) U.S. Cl.
  CPC ......... *B60W 50/029* (2013.01); *G05D 1/0214* (2013.01); *G05D 1/0231* (2013.01); *B60W 2050/0083* (2013.01); *B60W 2050/0215* (2013.01); *B60W 2555/20* (2020.02); *B60W 2556/65* (2020.02); *G05D 2201/0206* (2013.01); *G05D 2201/0211* (2013.01); *G05D 2201/0216* (2013.01)

(56) References Cited

U.S. PATENT DOCUMENTS

| | | | |
|---|---|---|---|
| 9,840,256 B1* | 12/2017 | Valois | G05D 1/021 |
| 10,223,912 B1* | 3/2019 | Agarwal | G08G 1/207 |
| 2010/0188188 A1 | 7/2010 | Funada et al. | |
| 2019/0189008 A1* | 6/2019 | Langona | G08G 1/005 |
| 2020/0183386 A1* | 6/2020 | Creusot | G06V 20/584 |
| 2020/0209869 A1 | 7/2020 | Toyoura et al. | |
| 2020/0264619 A1* | 8/2020 | Joseph | G08G 1/0129 |
| 2021/0078598 A1* | 3/2021 | Kim | G06V 40/10 |
| 2021/0229681 A1* | 7/2021 | Adam | G01S 17/66 |
| 2022/0081005 A1* | 3/2022 | Brown | G08G 1/166 |

OTHER PUBLICATIONS

European Patent Office, "Communication under Rule 71(3) EPC Intention to Grant," issued in connection with European Patent Application No. 21192682.9, dated Nov. 29, 2022, 8 pages.

European Patent Office, "Decision to grant a European patent pursuant to Article 97(1) EPC," issued in connection with European Patent Application No. 21192682.9, dated May 11, 2023, 2 pages.

Canadian Intellectual Property Office, "Examiner's Report," issued in connection with Canadian Patent Application No. 3,144,826, dated May 15, 2023, 6 pages.

Canadian Intellectual Property Office, "Office Action," issued in connection with Canadian Patent Application No. 3,144,826, dated Jan. 11, 2024, 6 pages.

* cited by examiner

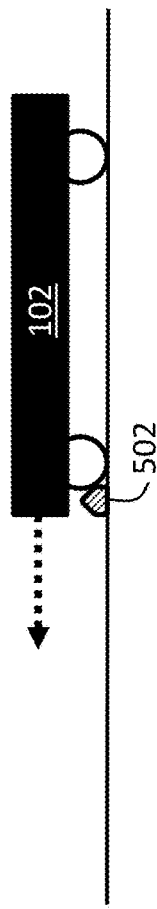
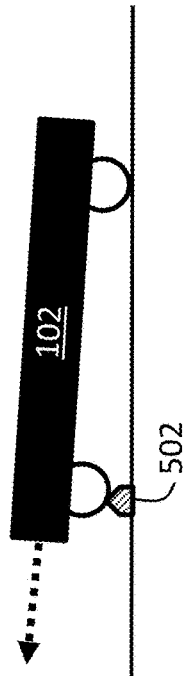
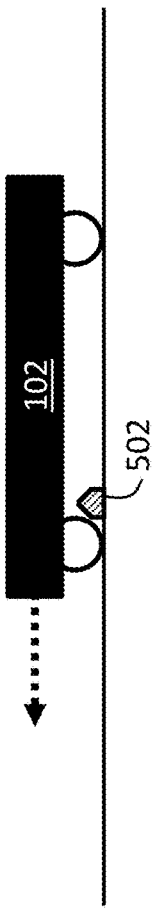
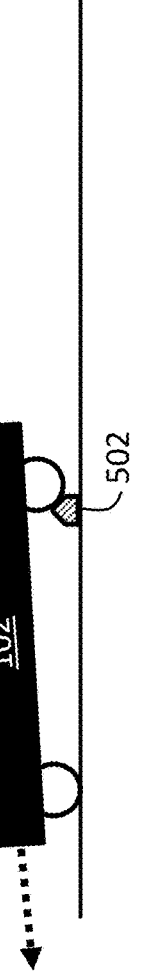
FIG. 5A — Level view 504a
FIG. 5B — Upward view 504b
FIG. 5C — Level view 504c
FIG. 5D — Downward view 504d
FIG. 5E — Level view 504e

SYSTEMS AND METHODS FOR AUTONOMOUS VEHICLE OPERATION

TECHNICAL FIELD

The following disclosure is directed to systems and methods for autonomous vehicle operation and, more specifically, systems and methods for sensor data adjustment in autonomous vehicle operation.

BACKGROUND

Autonomous vehicles can be configured to navigate open spaces (e.g., in air, over land, under water, etc.). For example, autonomous vehicles can be configured to navigate within an area that includes obstacles or humans. Such an area may be a warehouse, a retail store, a hospital, an office, etc. To successfully navigate such areas, autonomous vehicles can rely on one or more sensors. However, in some instances, sensors may be overly sensitive to certain environmental inputs, causing the vehicles to operate less efficiently.

SUMMARY

Described herein are example systems and methods for autonomous vehicle operation, including systems and methods for adjustment of sensor data of vehicle sensors.

In one aspect, the disclosure features a computer-implemented method for autonomous vehicle operation. The method can include receiving, by a processor, sensor data collected by a first sensor of a first autonomous vehicle during navigation of the first autonomous vehicle through a particular location and prior to a control signal subsequently generated by a controller of the first autonomous vehicle; determining, by the processor and based on the sensor data, an event that triggered the control signal; and transmitting to a second autonomous vehicle, by a communication device coupled to the processor, an instruction, based on the determined event, to adjust sensor data collected by a second sensor of the second autonomous vehicle during navigation of the second autonomous vehicle in the particular location.

Various embodiments of the method can include one or more of the following features.

The control signal can be generated to: (a) stop or slow the first autonomous vehicle; (b) divert the first autonomous vehicle from the particular location; or (c) transfer control of the first autonomous vehicle to a user. The first sensor of the first autonomous vehicle can include at least one of a camera or a LiDAR sensor. The determined event can include at least one of: (i) a deviation above a threshold of a field of view of the first sensor; (ii) a lighting condition occurring in the field of view of the first sensor; (iii) a characteristic of the particular location; (iv) a direction of navigation of the first autonomous vehicle; or (v) a time of day associated with the navigation of the first autonomous vehicle through the particular location.

The deviation in the field of view can correspond to a physical movement of the first sensor. The determined event can include the deviation The instruction can be to adjust the sensor data collected by the second sensor of the second autonomous vehicle to correct a deviation in a field of view of the second sensor. The determined event can include the lighting condition occurring in the field of view of the first sensor The instruction can be to disregard the sensor data collected by the second sensor of the second autonomous vehicle.

The determined event can include the direction of navigation of the first autonomous vehicle. The instruction can be to adjust the sensor data collected by the second sensor of the second autonomous vehicle according to a direction of navigation of the second autonomous vehicle. The determined event can include the time of day associated with the navigation of the first autonomous vehicle through the particular location. The instruction can be to adjust the sensor data collected by the second sensor of the second autonomous vehicle for a time period associated with the time of day. The method can include determining another instruction to reverse, after occurrence of the event, the adjustment of the sensor data collected by the second sensor, in which the determining is executed by at least one of (i) the processor or (ii) a processing unit of the second autonomous vehicle.

The determined event can include a lighting condition of a surface in the particular location, the lighting condition including at least one of a glare or a reflection. The instruction to adjust the sensor data can include an instruction to disregard at least a portion of the sensor data collected by the second sensor of the second autonomous vehicle from the surface. The first autonomous vehicle can be the same as the second autonomous vehicle and the first sensor is the same as the second sensor.

In another aspect, the disclosure features a system for autonomous vehicle operation. The system can include a processor configured to: receive sensor data collected by a first sensor of a first autonomous vehicle during navigation of the first autonomous vehicle through a particular location and prior to a control signal subsequently generated by a controller of the first autonomous vehicle; and determine, based on the sensor data, an event that triggered the control signal. The system can include a communication device coupled to the processor and configured to transmit to a second autonomous vehicle an instruction, based on the determined event, to adjust sensor data collected by a second sensor of the second autonomous vehicle during navigation of the second autonomous vehicle in the particular location.

Various embodiments of the system can include one or more of the following features.

The control signal can be generated to: (a) stop or slow the first autonomous vehicle; (b) divert the first autonomous vehicle from the particular location; or (c) transfer control of the first autonomous vehicle to a user. The first sensor of the first autonomous vehicle can include at least one of a camera or a LiDAR sensor. The determined event can include at least one of: (i) a deviation above a threshold of a field of view of the first sensor; (ii) a lighting condition occurring in the field of view of the first sensor; (iii) a characteristic of the particular location; (iv) a direction of navigation of the first autonomous vehicle; or (v) a time of day associated with the navigation of the first autonomous vehicle through the particular location.

The deviation in the field of view can correspond to a physical movement of the first sensor. The instruction can be to adjust the sensor data collected by the second sensor of the second autonomous vehicle to correct the deviation in a field of view of the second sensor. The instruction to adjust the sensor data can include an instruction to disregard at least a portion of the sensor data collected by the second sensor of the second autonomous vehicle from the surface.

The determined event can include the direction of navigation of the first autonomous vehicle The instruction can be to adjust the sensor data collected by the second sensor of the second autonomous vehicle according to a direction of navigation of the second autonomous vehicle. The determined event can include the time of day associated with the navigation of the first autonomous vehicle through the particular location The instruction can be to adjust the sensor data collected by the second sensor of the second autonomous vehicle for a time period associated with the time of day. The processor can be configured to include determining another instruction to reverse, after occurrence of the event, the adjustment of the sensor data collected by the second sensor, in which the determining is executed by at least one of (i) the processor or (ii) a processing unit of the second autonomous vehicle.

The determined event can include a lighting condition of a surface in the particular location, the lighting condition including at least one of a glare or a reflection.

In another aspect, the disclosure features a non-transitory computer-readable medium having instructions stored thereon that, when executed by one or more computer processors, cause the computer processors to perform operations comprising: receiving sensor data collected by a first sensor of a first autonomous vehicle during navigation of the first autonomous vehicle through a particular location and prior to a control signal subsequently generated by a controller of the first autonomous vehicle; determining, based on the sensor data, an event that triggered the control signal; and transmitting to a second autonomous vehicle an instruction, based on the determined event, to adjust sensor data collected by a second sensor of the second autonomous vehicle during navigation of the second autonomous vehicle in the particular location.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the systems and methods described herein. In the following description, various embodiments are described with reference to the following drawings.

FIGS. 5A-5E are a series of diagrams representing an autonomous vehicle encountering an adverse surface conditions and the associated sensor views.

DETAILED DESCRIPTION

In a warehouse setting (or in a retail store, a grocery store, a hospital, etc.), autonomous vehicles can navigate within aisles or spaces of the warehouse according to predetermined or variable paths. Additionally, autonomous vehicles have to navigate in coordination with or around other autonomous vehicles and/or human workers. To do so safely and efficiently, the autonomous vehicles depend on accurate and/or precise sensor operation to safely navigate a warehouse or retail setting. In some cases, one or more image or depth sensors (e.g., a camera or a LiDAR sensor) on an autonomous vehicle can be affected by surface conditions and/or lighting conditions (also referred to as "impediments" or "events" herein). The output of the sensors can be dynamically adjusted (e.g., corrected, disregarded, modified, etc.) to account for such conditions to prevent inefficient behavior (e.g., unnecessary stops, slowing down, a change in navigation path, etc.) by the autonomous vehicle.

The technology described herein may be employed in mobile carts of the type described in, for example, U.S. Pat. No. 9,834,380, issued Dec. 5, 2017 and titled "Warehouse Automation Systems and Methods," the entirety of which is incorporated herein by reference and described in part below.

Application to Autonomous Warehouse Carts

Figure 1A:
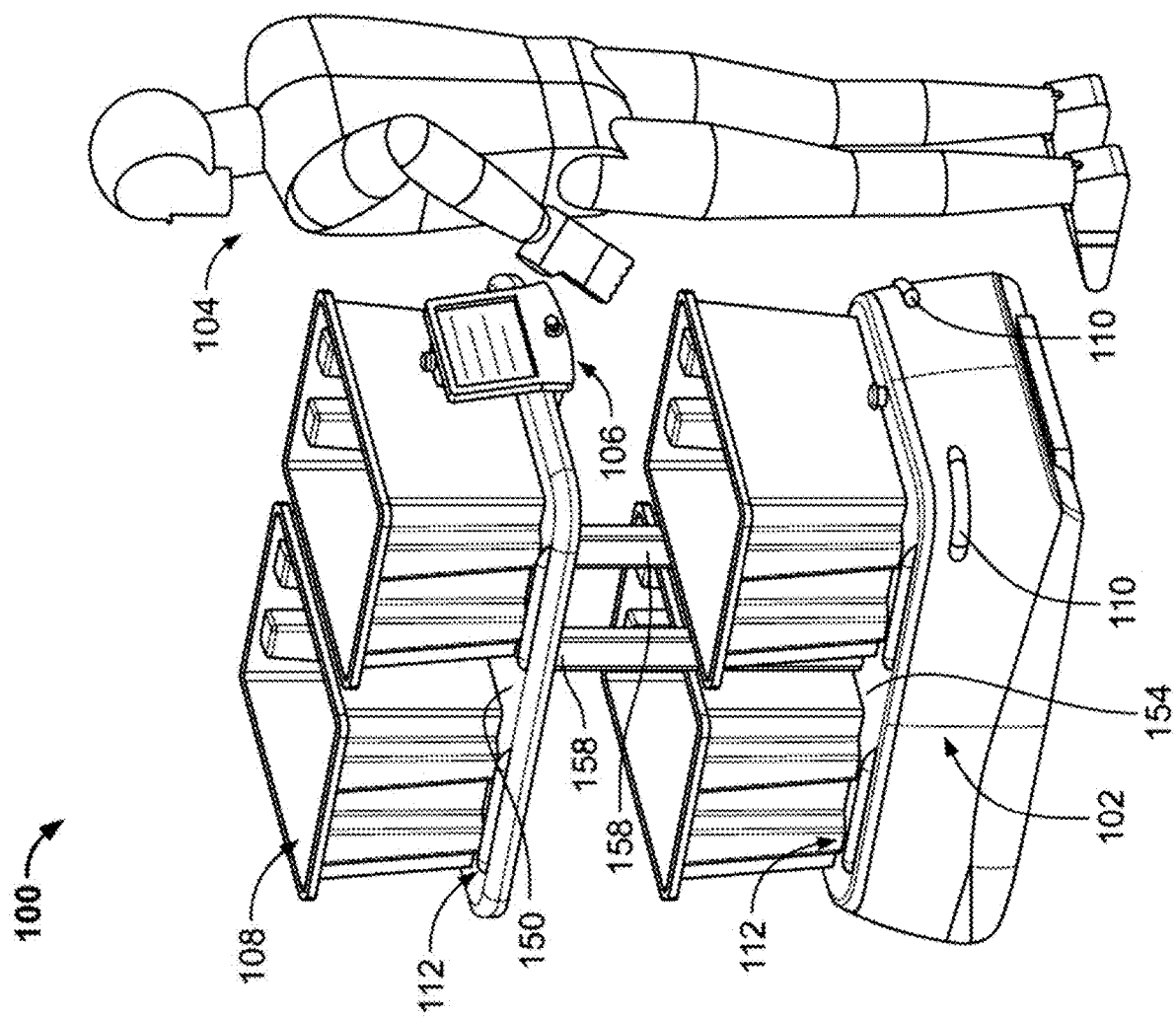
FIG. 1A is a model of an embodiment of an autonomous vehicle configured to execute tasks within a warehouse-type environment.

FIG. 1A depicts an enhanced cart system 100 including an enhanced cart 102 (e.g., an autonomous vehicle). As illustrated, one or more enhanced carts, often referred to in the industry as picking carts, can work alongside one or more warehouse workers 104 (also referred to as associates) to move inventory items around a warehouse. The enhanced carts 102 are intended to assist in most warehouse tasks, such as picking, re-stocking, moving, sorting, counting, or verifying items (e.g., products). These carts 102 can display information to the associate 104 through the use of a user interface (e.g., screen) 106 and/or onboard visual and/or audible indicators that improve the performance of the associates 104. The cart 102 can be propelled by a motor (e.g., an electric motor) that is coupled to a power source (e.g., a battery, a supercapacitor, etc.), such that the cart 102 moves autonomously and does not require being pushed or pulled by a human or other force. The cart 102 may travel to a charging area to charge its battery or batteries.

Referring still to FIG. 1A, the enhanced carts 102 may be configured to carry one or many similar or distinct storage containers 108, often in the form of totes or boxes, that can be used to hold one or more different products. These storage containers 108 may be removable from the enhanced cart 102. In some cases, the containers 108 are used to hold items that are picked from shelves (e.g., to fill a customer order). In some cases, each container 108 can be used as a separate picking location (i.e., one container 108 is a single order). In other cases, the containers 108 can be used for batch picking (i.e., each container 108 can contain multiple complete or partial orders). Each container 108 may be assigned to one or many different stations for post-pick sortation and processing. In one embodiment, one or more of the containers 108 are dedicated to batch picking of multiple types of products and another one or more containers 108 are dedicated to picking multiple quantities of a single product (e.g., for orders that only have one item). This singleton picking allows the warehouse to skip secondary sortation and deliver products directly to a packaging station. In another embodiment, one or more of the containers 108 are assigned to order picking (e.g., for potentially time sensitive orders) and one or more of the containers 108 are assigned to batch picking (e.g., for lower cost or less time sensitive orders). In yet another embodiment, one or more of the containers 108 carry product that will be used to re-stock product into storage locations. Another option is for the enhanced cart 102 to move product and/or shipments throughout the warehouse as needed between different stations, such as packing and shipping stations. In yet another implementation, one or more of the containers 108 is left empty to assist in counting product into and then back out of the container 108 as part of a cycle count task regularly carried out in warehouses for inventory management. The tasks may be completed in a mode dedicated to one task type or interleaved across different task types. For example, an associate 104 may be picking products into container "one" on the enhanced cart 102 and then be told to grab products from container "two" on the enhanced cart 102 and put them away in the same aisle.

Figure 1B:
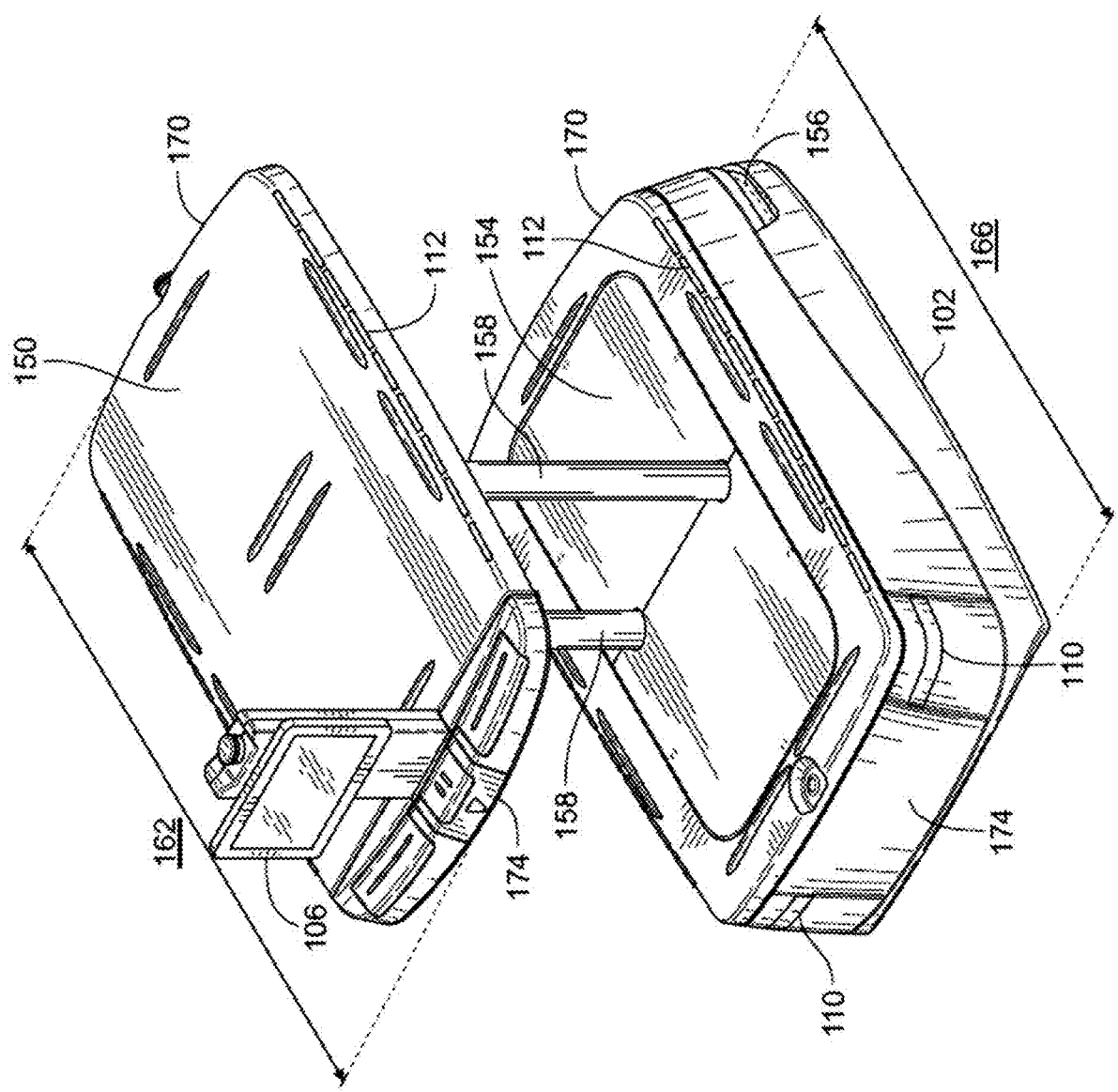
FIG. 1B is a model of another embodiment of an autonomous vehicle configured to execute tasks within a warehouse-type environment.

FIG. 1B is an alternative embodiment of the enhanced cart 102, and is shown (for ease of understanding) without the storage containers 108 being present. As before, the enhanced cart 102 includes the screen 106 and lighting indicators 110, 112. In operation, the storage containers 108 may be present on the enhanced cart 102 depicted in FIG. 1B. With reference to both FIGS. 1A and 1B, the enhanced cart 102 may include first and second platforms 150, 154 for supporting a plurality of containers 108 capable of receiving products. At least one support 158 may support the first platform 150 above the second platform 154. The at least one support 158 may be substantially centrally-located along respective lengths 162, 166 of the first and second platforms 150, 154 between front and back ends 170, 174 thereof and may support the first and second platforms 150, 154 at locations disposed within interior portions of the first and second platforms 150, 154. As illustrated in FIG. 1B, the front end 170 of the cart 102 may define a cutout 156. There may be one or more sensors (e.g., light detecting and ranging (LiDAR) sensors) housed within the cutout 156. The cutout 156 permits the sensor(s) to view and detect objects in front of and to the side of (e.g., more than 180° around) the cart 102.

The following discussion focuses on the use of autonomous vehicles, such as the enhanced cart 102, in a warehouse environment, for example, in guiding workers around the floor of a warehouse and carrying inventory or customer orders for shipping. However, autonomous vehicles of any type can be used in many different settings and for various purposes, including but not limited to: guiding shoppers or stocking inventory in a retail store, driving passengers on roadways, delivering food and medicine in hospitals, carrying cargo in shipping ports, cleaning up waste, etc. The autonomous vehicles can be employed in a warehouse-like environment open to the public (e.g., big box stores or wholesalers). This disclosure, including but not limited to the technology, systems, and methods described herein, is equally applicable to any such type of autonomous vehicle.

Computing Systems for Autonomous Vehicle Operation

Figure 2:
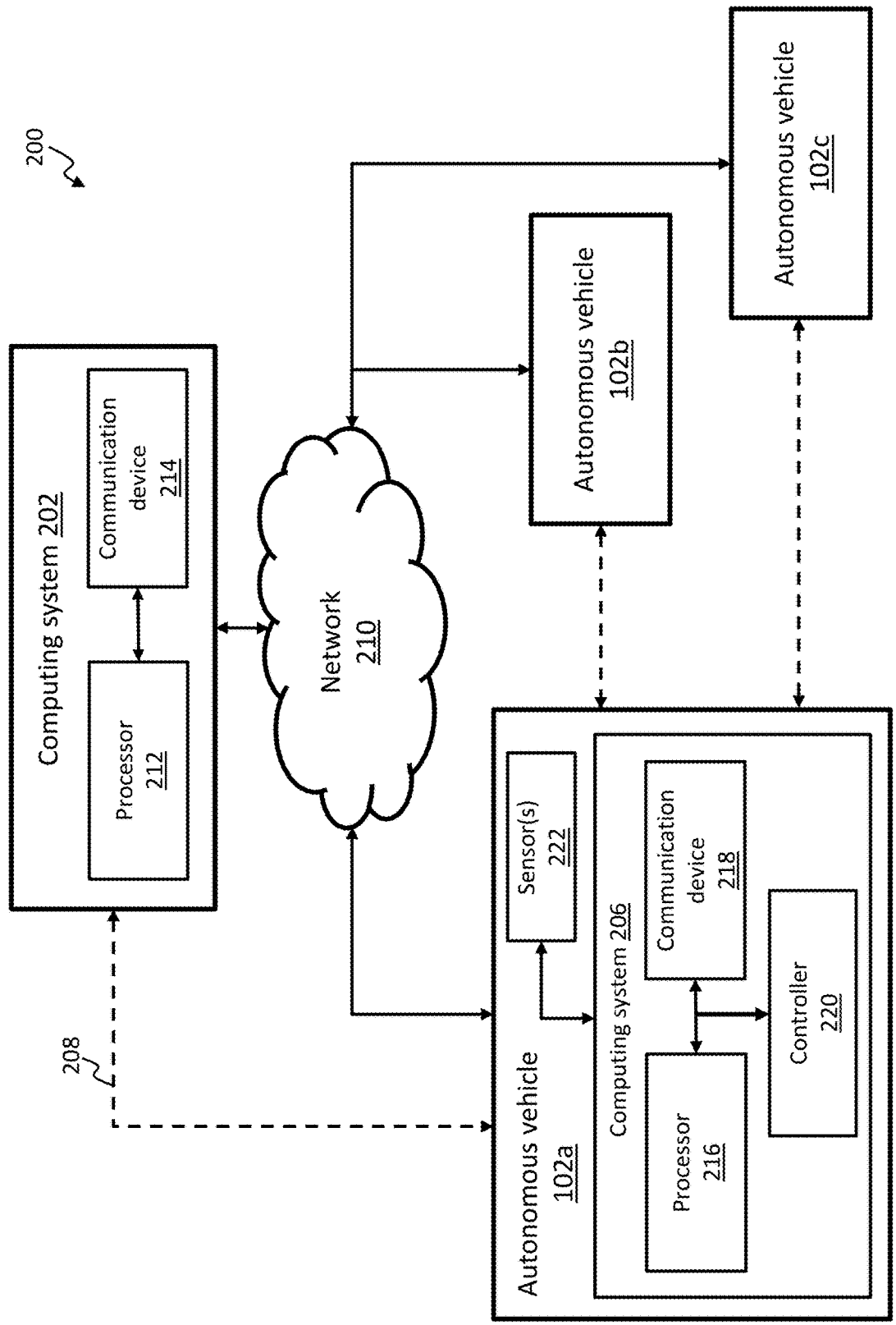
FIG. 2 is a diagram of an embodiment of a system for sensor data adjustment in autonomous vehicle operation.

FIG. 2 illustrates a system 200 configured for sensor data adjustment in autonomous vehicles. The system 200 may include a remote computing system 202 configured to be coupled directly or indirectly to one or more autonomous vehicles 102a, 102b, 102c (collectively referred to as 102). For instance, the remote computing system 202 may communicate directly with the computing system 206 of an autonomous vehicle 102 (e.g., via communication channel 208). Additionally or alternatively, the remote computing system 202 can communicate with one or more autonomous vehicles 102 via a network device of network 210. In some embodiments, the remote computing system 202 may communicate with a first autonomous vehicle (e.g., vehicle 102a) via a second autonomous vehicle (e.g., vehicle 102b).

The example remote computing system 202 may include one or more processors 212 coupled to a communication device 214 configured to receive and transmit messages and/or instructions (e.g., to and from autonomous vehicle(s) 102). The example vehicle computing system 206 may include a processor 216 coupled to a communication device 218 and a controller 220. The vehicle communication device 218 may be coupled to the remote communication device 214. The vehicle processor 216 may be configured to process signals from the remote communication device 214 and/or vehicle communication device 218. The controller 220 may be configured to send control signals to a navigation system and/or other components of the vehicle 102, as described further herein. The vehicle 102 can include one or more sensors 222 configured to capture sensor data (e.g., images, video, audio, depth information, etc.) and transmit the sensor data to the remote computing system 202 and/or to the vehicle computing system 206. As discussed herein and unless otherwise specified, the term "computing system" may refer to the remote computing system 202 and/or the vehicle computing system 206.

The computing system(s) may receive and/or obtain information about one or more tasks, e.g., from another computing system or via a network. In some cases, a task may be customer order, including the list of items, the priority of the order relative to other orders, the target shipping date, whether the order can be shipped incomplete (without all of the ordered items) and/or in multiple shipments, etc. In some cases, a task may be inventory-related, e.g., restocking, organizing, counting, moving, etc. A processor (e.g., of system 202 and/or of system 206) may process the task to determine an optimal path for one or more autonomous vehicles 102 to carry out the task (e.g., collect items in a "picklist" for the order or moving items). For example, a task may be assigned to a single vehicle or to two or more vehicles 102.

The determined path may be transmitted to the controller 220 of the vehicle 102. The controller 220 may navigate the vehicle 102 in an optimized sequence of stops (also referred to as a trip) within the warehouse to collect or move items. At a given stop, a worker near the vehicle 102 may physically place the item into a container 108 for the vehicle 102 to carry. Alternatively or additionally, the autonomous vehicle 102 may include an apparatus (e.g., a robotic arm) configured to collect items into a container 108.

Navigation Events

As discussed above, autonomous vehicles 102 can be tasked with collecting items, moving items, and/or shelving items within the warehouse. While navigating to complete such tasks, an autonomous vehicle 102 may encounter one or more surface or lighting conditions events that challenge its sensors. In some instances, such impediments may be temporary and/or transient. The impediments may be associated with one or more locations and/or one or more directions of travel. For instance, the vehicle 102 may encounter a bump or ditch in the surface of travel. Warehouses and fulfillment centers are large industrial-type building that typically do not have the same level of finish in building construction as some retail or residential buildings. Accordingly, warehouses may have certain patches of rough floor, including small bumps or dips in the floor. In some cases, the vehicle may run over a piece of debris or temporary structure (e.g., a cover for a cable on the floor).

These unsmooth areas of floor may cause extreme movement in the sensor view (e.g., camera and/or LiDAR field-of-view) of an autonomous vehicle 102 as it is jostled up-and-down or side-to-side within a short period of time as it traverses the surface impediment.

In some cases, the vehicle 102 may encounter lighting conditions at certain times of the day, e.g., glare or reflections 30 minutes before sunset, that may inhibit the ability of the vehicle to rely on its sensors for navigation. For example, the lighting condition may be due to sunlight (e.g., in the daytime, morning, afternoon, etc.) hitting a location in the vehicle's path and causing the glare or reflection. In some cases, the lighting condition may be due to the variability of the sunlight as the sunlight can be different each day (e.g., because of clouds or other weather conditions). In another example, the ceiling lights may turn on or provide greater illumination at certain times of the day (e.g., at night). In some cases, the ceiling lights may cause glare, inhibiting the ability of the vehicle to navigate.

In some instances, the impediments may be permanent, semi-permanent, periodic, sporadic, seasonal, or fixed for an extended amount of time (e.g., weeks, months, years, etc.). A new feature may not be accounted for in an initial mapping of the warehouse for the vehicle 102. For example, the warehouse may be modified with a permanent feature (e.g., a ramp, a window, a track in the floor for a space divider or machinery, etc.). In another example, the warehouse may be modified with a seasonal or time-dependent feature. For example, ceiling lighting may be on much longer during winter months than in summer months. In another example, during the holiday season, some types of debris (e.g., glitter or reflective materials from holiday decorations, broken glass from string lights, etc.) on the warehouse floor may be more common than other times of the year.

The physical movements or blocking of the sensor views may result in inaccurate feedback to the processor and/or controller of the vehicle, causing the vehicle to stop or slow down unnecessarily, thereby reducing its efficiency in completing its tasks. For instance, the sensors of the vehicle may detect an impediment in the path of the vehicle 102 as the vehicle navigates and send a signal to the controller (e.g., directly or by way of the processor) to slow down and stop the vehicle. Additionally, the assessment of an impediment by the sensors and/or processor of the vehicle may require computational resources that may not be available or may be costly.

Sensor Data Adjustment

An automated system can be configured to adjust sensor data to account for one or more navigation events, as discussed above. In some embodiments, the automated system adjusts the interpretation of the sensor data. In some embodiments, the automated system adjusts one or more transformations applied to the sensor data. By adjusting the sensor data, the vehicle may be prevented from overreacting to relatively harmless impediments to maintain a certain level of efficiency in a warehouse. For example, the stopping or slowing down of a vehicle through a path with strong glare may be undesirable. The automated system may include one or more autonomous vehicles 102 and/or one or more remote computer systems 202 in communication with the autonomous vehicles 102.

Figure 3:
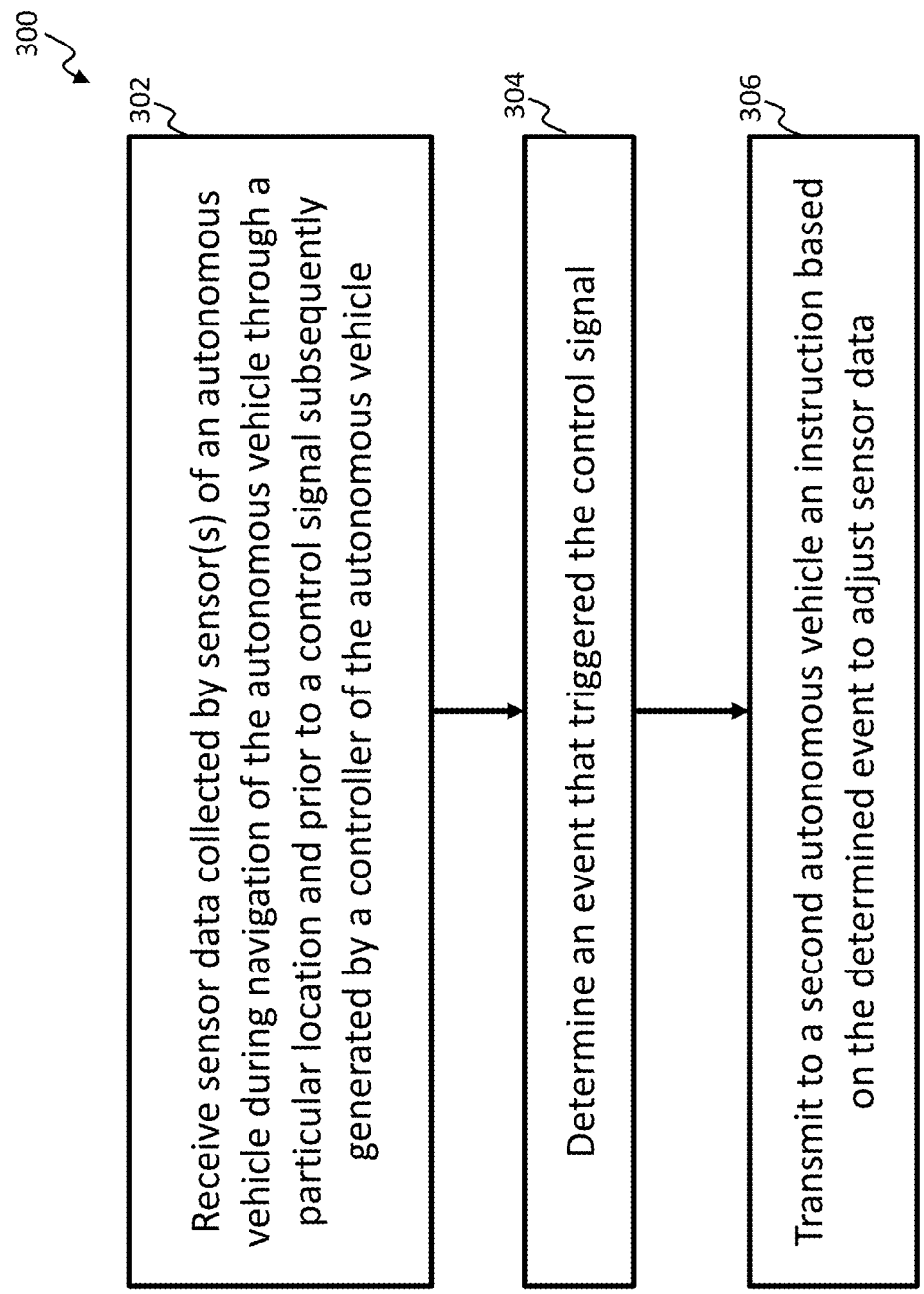
FIG. 3 is a flowchart of an embodiment of a method for sensor data adjustment in autonomous vehicle operation.
Figure 4:
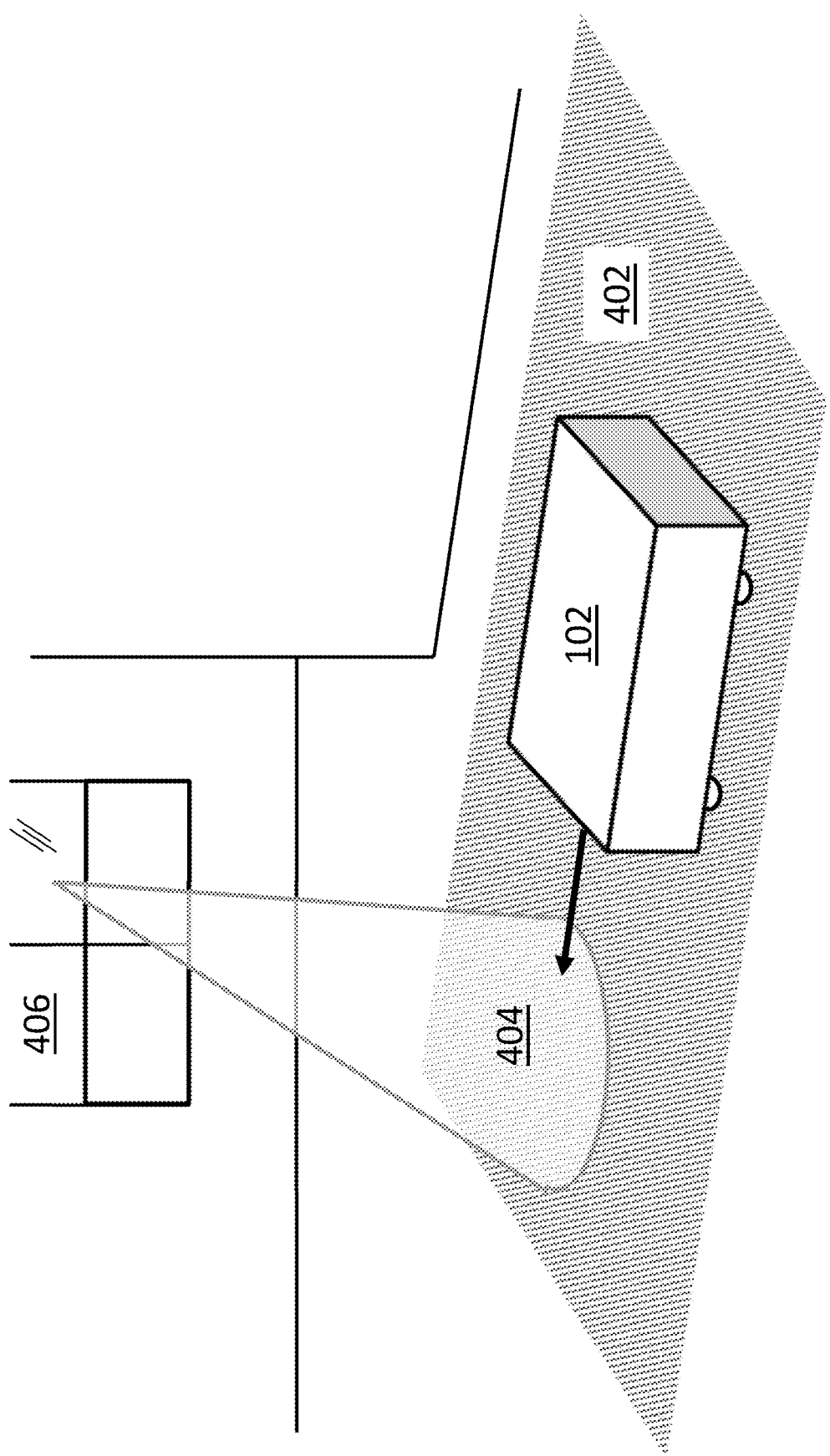
FIG. 4 is a diagram of an autonomous vehicle encountering an adverse lighting condition.

FIG. 3 is a flowchart of a method 300 for autonomous vehicle operation. In step 302, a processor (e.g., a processor 216 or processor 212) is configured to receive sensor data (e.g., image data, depth data, LiDAR sensor data, etc.) collected by one or more sensors (e.g., sensors 222) of an autonomous vehicle (e.g., vehicle 102a). The sensor data may be collected during the navigation of the autonomous vehicle 102 through a particular location, locations with shared conditions, and/or particular navigation conditions. For instance, the particular location can be a location along the navigation path of the vehicle 102 within a warehouse or any other location the vehicle 102 is configured to traverse. In some cases, the sensor data may be collected during navigation with particular conditions (e.g., surface and/or lighting conditions). FIG. 4 illustrates a vehicle 102 navigating a path 402 in a south-facing portion of a warehouse located in a located in the northern hemisphere. As illustrated, the sensors 222 of a vehicle 102 traversing the path 402 during the afternoon may trigger a navigation event due to glare 404 from strong sunlight through a window 406.

In some embodiments, particular locations may be similar in conditions such that the same or similar navigation events occur. For example, two or more areas of a building floor may undergo similar lighting conditions (e.g., high-wattage ceiling lights positioned over certain zones or aisles of a building, etc.). For example, two or more aisles of a warehouse floor may experience strong afternoon sunlight from south-facing windows of a building located in the northern hemisphere. In such a case, sensor data may be generated from a light sensor, a heat sensor, a camera, etc. indicative of such a lighting condition or a compass indicative of the direction of travel for a vehicle 102. As the vehicle 102 is traveling in a south-bound direction in a warehouse floor, the compass may generate compass data, triggering an event likely to impede the efficient and/or safe navigation of the vehicle 102. In another example, a floor cover for a cable running across multiple aisles of a warehouse may result in shared conditions in each of the aisles.

In some embodiments, the sensor data may be collected prior to, during, and/or after a control signal that is subsequently generated by a controller 220 of the vehicle 102a. For example, for sensor data collected prior to the control signal being generated, the sensor data may reflect a vehicle 102 driving up a bump. In another example of sensor data collected prior to, during, and after the control signal being generated, if the vehicle 102 drove over a bump at a particular location, the sensor data may reflect the occurrence of the bump. In particular, the sensor data (e.g., image or depth data) is likely to demonstrate the difference in images and/or depth relative to the vehicle 102 as the vehicle travels up the bump and then back down the bump. In another example, if the sensors 222 experience a glare or reflection from a surface near the sensors, the corresponding sensor data may reflect the glare or reflection before the control signal slows or stops the vehicle 102.

FIGS. 5A-5E illustrate the sensor data collected from image and/or depth sensors as the vehicle goes over a bump 502 (the navigation event). As the vehicle 102 travels over a bump 502 in its navigation path, the corresponding sensor fields-of-view 504a-504e (collectively referred to as views 504) are provided. The sensor views 504 may include: (a) a level view 504a, (b) an upward view 504b, (c) a level view 504c, (d) a downward view 504d, and (e) a level view 504e. Note that the wheel number and orientation of vehicle 102 can affect the sensor views 504. For example, if the vehicle 102 had additional or fewer wheels in its body, there may be additional upward, level, and/or downward views.

In some embodiments, a deviation (e.g., the upward view or the downward view) in the sensor field-of-view may be compared to a threshold to determine whether the vehicle 102 encountered a navigation event. This threshold may be predetermined or dynamically determined. The threshold may be dependent on the type of navigation event (e.g., surface vs. lighting condition, etc.). In some embodiments, the deviation in the sensor field-of-view may have a temporal threshold, e.g., depending on the speed of the vehicle, the type of navigation event, etc. For example, the vehicle 102 may drive through a glare for one or more minutes so a corresponding threshold may be 30 seconds or 1 minute. In another example, the vehicle 102 may drive over a bump relatively quickly (e.g., within a few seconds). Accordingly, the corresponding threshold may be 0.5 seconds, 1 second, etc.

In some embodiments, the controller 220 may generate a control signal upon the vehicle 102 and/or sensors 222 experiencing a navigation event. The control signal may be indicative of the navigation event. For example, if the navigation event was a bump, the control signal may instruct the vehicle 102 to slow, stop, drive through, go around the bump, or divert from its path. If the navigation event was a glare or reflection, the control signal may instruct the vehicle to slow, stop, drive through, etc.

In step 304, the processor may determine an event that triggered the control signal based on the sensor data. For example, if images of the sensor data appeared as illustrated in FIGS. 5A-5E, the processor may determine that the vehicle 102 drove over a bump 502. If the sensor field-of-view was washed out or saturated with light, then the processor may determine the existence of glare or reflection.

In some embodiments, the processor may generate an instruction based on the determined event to adjust the sensor data collected by a sensor 222 of an autonomous vehicle (e.g., vehicle 102a, 102b, 102c, etc.) during navigation of the vehicle to the particular location or encountering particular conditions.

Figure 6:
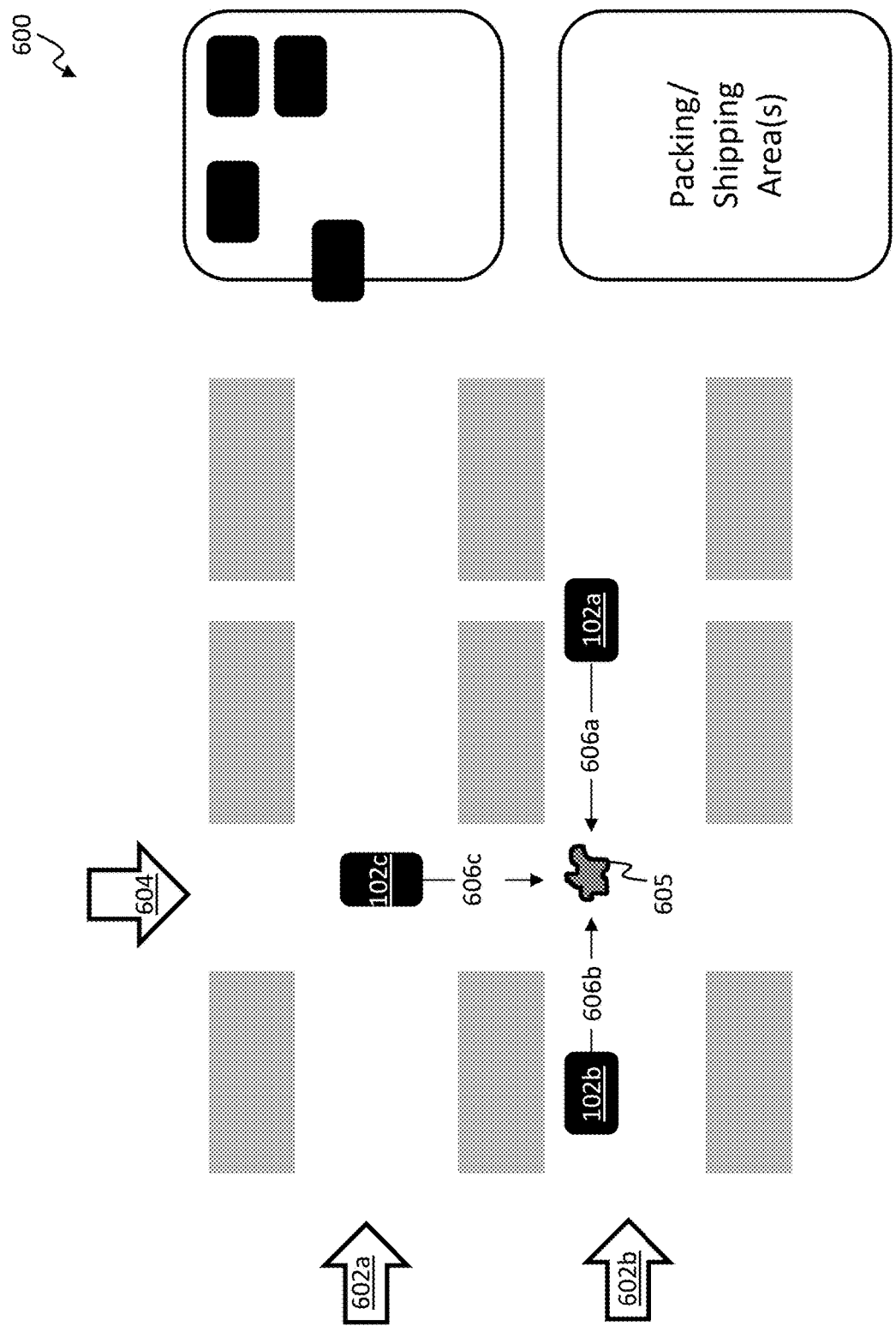
FIG. 6 is a diagram of an embodiment of an automated warehouse including one or more autonomous vehicles.

In some embodiments, the instruction to adjust sensor data can be configured or modified for the direction of travel of an autonomous vehicle 102. For instance, if a first autonomous vehicle 102a encountered the navigation event in a first direction, the instruction generated by the processor may include sensor adjustment instructions for the first direction. In some embodiments, the instructions may include sensor adjustment instructions for at least one other direction than the first direction, e.g., the opposite direction, a direction separated by 90 degrees from the first direction, etc. For example, a warehouse floor is typically set up in aisles such that many navigation paths are in primarily in parallel or perpendicular orientations to one another. FIG. 6 illustrates an example warehouse floor 600 having aisles 602a, 602b, configured parallel to each other and corridor 604 configured in perpendicular to aisles 602a and 602b. In this example, a vehicle 102a encounters a navigation event 605 (e.g., a surface or lighting condition). The instruction generated by a processor (referred to as the "originating processor") and associated with a first direction 606a can be modified for various other directions. For example, the instruction can be modified for the opposing direction 606b or the 90 degree offset direction 606c. The instruction may be modified by the processor of the receiving vehicle. For example, vehicle 102c may receive the instruction from vehicle 102a and modify the sensor adjustment instruction according to its direction 606c of approach to the navigation event 605. In some embodiments, the originating processor may send an instruction that includes sensor adjustments for two or more directions. For example, due to the typical warehouse floor layout 600, the instruction may include sensor adjustments for the opposing direction 606b, 90 degree offset direction 606c, etc.

In some embodiments, the processor may generate multiple instructions based on the same navigation event. The multiple instructions may relate to multiple adjacent locations relative to the particular location of the navigation event. For example, if the vehicle 102 encounters a glare in one aisle of the warehouse, the processor can generate instructions corresponding to expected glare in adjacent aisles in the warehouse.

In some embodiments, the processor may generate a first instruction for adjusting sensor data and a second instruction to "undo" or reverse the adjustment of the sensor data. This may be beneficial when the navigation event is temporary (e.g., a glare in a short time period of July and August afternoons).

In some embodiments, the processor may generate one or more versions of an instruction to adjust sensor data. The versions may be dependent on the model, type, size, shape, etc. of autonomous vehicle 102 and/or the type and calibration of a vehicle sensors 222. For example, a first instruction may be for vehicles having 4 inch distance between the floor and a camera lens of the sensor and a second instruction may be for vehicles having a 6 inch clearance.

In step 306, the instruction may be transmitted to a computing system to adjust sensor data. For instance, the instruction may be transmitted within the same autonomous vehicle (e.g., from one component to another component of vehicle 102a), from one autonomous vehicle (e.g., 102a) to other autonomous vehicle(s) (e.g., vehicle 102b and/or vehicle 102c), and/or from one autonomous vehicle (e.g., 102a) to a remote computing system 202 to be used by another vehicle (e.g., 102a or 102b) navigating through the same location. In some embodiments, a communication device 218 of a vehicle 102a may transmit the instruction to a communication device 218 of another vehicle 102b. In some embodiments, a first module within the processor 216 of a vehicle 102a may transmit the instruction to a second module of the processor 216 of vehicle 102a. For example, the first module may be configured to generate the instruction, as described above, and the second module may be configured to adjust sensor data. In some embodiments, a communication device 214 of the remote computing system 202 may transmit the instruction to a communication device 218 of a vehicle 102a. In some embodiments, a communication device 218 of the vehicle 102a may transmit the instruction to a communication device 214 of a remote computing system 202. In some cases, the instruction may be time-dependent (e.g., certain times of day, certain times of year, during temporary warehouse configurations, during temporary warehouse conditions, etc.). Therefore, the processor may apply the instruction during the relevant time (e.g., during a 45 minute window in the afternoon with strong glare or a wet floor that should dry within 20 minutes) and may stop applying the instruction after that time. In some embodiments, the instruction may be transmitted periodically (e.g., once every hour, half a day, one day, etc. or at the end of the day, beginning of the day, etc.) so that multiple vehicles are "synched" with the same or similar instruction.

In some embodiments, the processor (e.g., processor 212 or 216) is configured to adjust the sensor data based on the received instruction. Adjustment can include modifying, disregarding, suppressing, etc. the sensor data. For physical impediments to the navigation of the vehicle, the sensor output data can be adjusted (e.g., by a processor) to account for the impediment. For instance, the translational and/or rotational shift present in the sensor data indicative of the sensor's field of view may be corrected dynamically (e.g., in real time or near-real time). In some embodiments, once an adjusted angle or transformation is determined for each frame of the sensor data, the new artificially-adjusted sensor data can be produced to transform each image or depth frame into a new frame. Referring back to FIGS. 5A-5E, if a vehicle 102 travels over a bump 502 in its navigation path or in a particular location, the sensor views while traversing that obstacle may include: (a) a level view, (b) an upward view, (c) a level view, (d) a downward view, and (e) a level view. A processor may apply corrections (e.g., in software) to the resulting sensor data preemptively, e.g., prior to transmitting the sending data to another component (e.g., a controller 220). The corrections may correspond to the sensor views as follows: (a') no correction, (b') downward correction or suppression of data, (c') no correction, (d') upward correction or suppression of data, and (e') no correction.

For lighting-related obstructions to vehicle navigation, the sensor output data can be adjusted (e.g., by a computer processor) to account for the obstruction. In particular, lighting conditions (e.g., glare or reflections) that impede the sensor's field of view may be corrected dynamically (e.g., in real time or near-real time). For example, if a vehicle encounters a recently washed floor in a warehouse, the overhead lights may cause a significant reflection from the floor (e.g., while the floor is still wet) toward the vehicle's camera lens. Referring to the example illustrated in FIG. 4, light 404 coming through a warehouse window 406 at a particular time and/or angle on a sunny day may cause a significant glare in the vehicle sensor's camera lens. In some implementations, a processor may apply corrections to the portions of the data that are washed out and/or do not contain useful visual or depth information to enable the vehicle to navigate. In some implementations, the processor may disregard certain information (e.g., image data) and instead use depth information (e.g., LiDAR sensor data) to overcome particular conditions. In some implementations, the processor may preemptively change exposure settings and/or reduce resolution in the camera of a vehicle traveling in a path with known temporary obstruction.

In some implementations, to avoid overreaction and/or false positives by an autonomous vehicle to temporary obstructions, the processor may adjust the sensor data for an event (e.g., a physical obstruction or a lighting-related obstruction) to reduce the frequency of triggering a control signal from the controller. For example, the unadjusted sensor data trigger a control signal which may cause the vehicle to apply brakes (e.g., stop or slow down), divert the vehicle from its path, transfer control to a user (e.g., a human worker), etc. For example, if an event happens very quickly (e.g., the vehicle goes over a small bump in under 1 second), a control signal may be sent within 1 second of the event. However, the sensor data can be adjusted or disregarded such that a control signal is sent only if the event persists for 5 seconds or longer. In another example, an event may be persistent but harmless (e.g., a reflection from the travel surface). A control signal may cause the vehicle to stop within 1 meter of the detected reflection (the predetermined threshold). The processor may send an instruction to the controller with adjusted sensor data such that the vehicle can slow down but continue to travel over the surface having the reflection (e.g., reduce the threshold to zero meters).

In some embodiments, the adjusted sensor data may be tested in one or more additional vehicles (e.g., 102b, 102c, etc.) before being broadcast to a larger group of vehicles. In this way, a processor (e.g., of vehicle 102b, vehicle 102c, or of remote computing system 202) may determine that the sensor data may need to be further adjusted or that the impediment has been resolved in another way (e.g., cleaned up, fixed, a window was obscured, path has been entirely blocked, etc.).

In some embodiments, a computing system may use the adjusted sensor data through a simulator of a vehicle (e.g., a vehicle's controller 220) to determine whether the adjusted sensor data triggers an undesirable reaction (e.g., an inefficient slowing or stopping of the vehicle). The adjusted sensor data may be further adjusted until the simulated vehicle operates as desired.

In some embodiments, if sensor data adjustment does not produce the desired effect in the vehicle 102, then a processor may mark the particular location or locations with the condition as unsafe or requiring human assistance for safe traversal (e.g., in "manual mode only").

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 7:
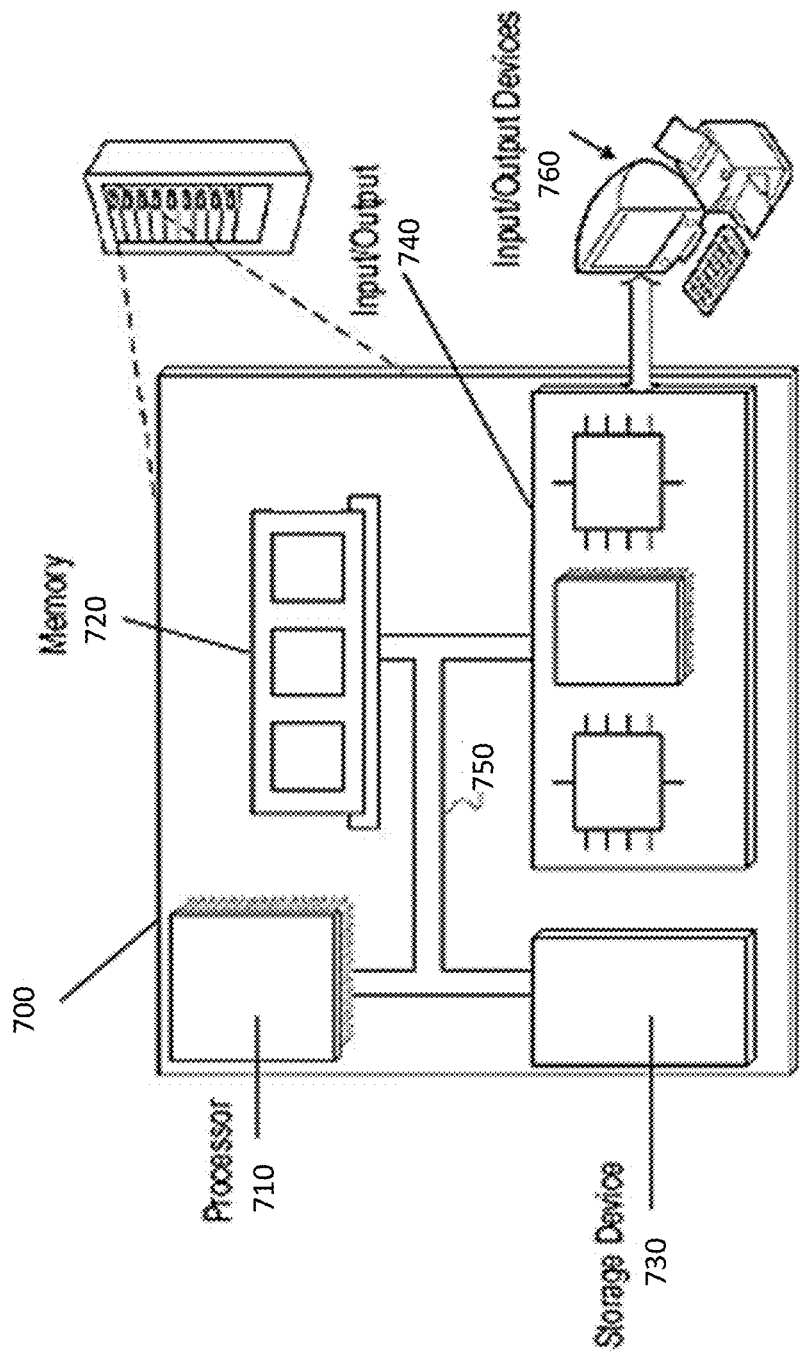
FIG. 7 is a block diagram of an embodiment of a computer system used in implementing the systems and methods described herein.

FIG. 7 is a block diagram of an example computer system 700 that may be used in implementing the systems and methods described herein. General-purpose computers, network appliances, mobile devices, or other electronic systems may also include at least portions of the system 700. The system 700 includes a processor 710, a memory 720, a storage device 730, and an input/output device 740. Each of the components 710, 720, 730, and 740 may be interconnected, for example, using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730.

The memory 720 stores information within the system 700. In some implementations, the memory 720 is a non-transitory computer-readable medium. In some implementations, the memory 720 is a volatile memory unit. In some implementations, the memory 720 is a nonvolatile memory unit.

The storage device 730 is capable of providing mass storage for the system 700. In some implementations, the storage device 730 is a non-transitory computer-readable medium. In various different implementations, the storage device 730 may include, for example, a hard disk device, an optical disk device, a solid-date drive, a flash drive, or some other large capacity storage device. For example, the storage device may store long-term data (e.g., database data, file system data, etc.). The input/output device 740 provides input/output operations for the system 700. In some implementations, the input/output device 740 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 760. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 730 may be implemented in a distributed way over a network, such as a server farm or a set of widely distributed servers, or may be implemented in a single computing device.

Although an example processing system has been described in FIG. 7, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

The invention claimed is:

1. A computer-implemented method for autonomous vehicle operation, the method comprising:
    receiving, by a processor, sensor data collected by a first sensor of a first autonomous vehicle during navigation of the first autonomous vehicle through a first location, the sensor data collected prior to a control signal subsequently generated by a controller of the first autonomous vehicle;
    determining, by the processor and based on the sensor data, an event associated with the first location that triggered the control signal;
    identifying, by the processor, an association between (a) the determined event associated with the first location and (b) a condition at a second location, the second location different than the first location;
    determining, by the processor, that a second autonomous vehicle is traveling along a navigation path including the second location; and
    transmitting to the second autonomous vehicle, by a communication device coupled to the processor, signals corresponding to an instruction, based on the determined event, to cause the sensor data collected by a second sensor of the second autonomous vehicle to be adjusted during navigation of the second autonomous vehicle through the second location.

2. The method of claim 1, wherein the control signal is generated to:
    (a) stop or slow the first autonomous vehicle;
    (b) divert the first autonomous vehicle from the first location; or
    (c) transfer control of the first autonomous vehicle to a user.

3. The method of claim 1, wherein the first sensor of the first autonomous vehicle includes at least one of a camera or a LiDAR sensor.

4. The method of claim 1, wherein the determined event includes at least one of:
    (i) a deviation above a threshold of a field of view of the first sensor;
    (ii) a lighting condition occurring in the field of view of the first sensor;
    (iii) a characteristic of the first location;
    (iv) a direction of navigation of the first autonomous vehicle; or
    (v) a time of day associated with the navigation of the first autonomous vehicle through the first location.

5. The method of claim 4, wherein the deviation in the field of view corresponds to a physical movement of the first sensor.

6. The method of claim 4, wherein the determined event includes the deviation, and wherein the instruction is to cause the sensor data collected by the second sensor of the second autonomous vehicle to be adjusted to correct a deviation in a field of view of the second sensor.

7. The method of claim 4, wherein the determined event includes the lighting condition occurring in the field of view of the first sensor, and wherein the instruction is to cause the sensor data collected by the second sensor of the second autonomous vehicle to be disregarded.

8. The method of claim 4, wherein the determined event includes the direction of navigation of the first autonomous vehicle, and wherein the instruction is to cause the sensor data collected by the second sensor of the second autonomous vehicle to be adjusted according to a direction of navigation of the second autonomous vehicle.

9. The method of claim 4, wherein the determined event includes the time of day associated with the navigation of the first autonomous vehicle through the first location, and wherein the instruction is to cause the sensor data collected by the second sensor of the second autonomous vehicle to be adjusted for a time period associated with the time of day.

10. The method of claim 1, wherein the instruction is a first instruction and further including:
    generating, by at least one of (i) the processor or (ii) a processor of the second autonomous vehicle, a second instruction to cause, after occurrence of the event, the adjustment of the sensor data collected by the second sensor to be reversed.

11. The method of claim 1, wherein the determined event includes a lighting condition of a surface in the first location, the lighting condition including at least one of a glare or a reflection.

12. The method of claim 11, wherein the instruction is to cause at least a portion of the sensor data collected by the second sensor of the second autonomous vehicle from the surface to be disregarded.

13. The method of claim 1, wherein the first sensor is the same as the second sensor.

14. A system for autonomous vehicle operation, the system comprising:
    memory;
    machine-readable instructions;
    a processor to execute the machine-readable instructions to:
        receive sensor data collected by a first sensor of a first autonomous vehicle during navigation of the first autonomous vehicle through a first location, the sensor data collected prior to a control signal subsequently generated by a controller of the first autonomous vehicle;
        determine, based on the sensor data, an event associated with the first location that triggered the control signal;
        identify an association between (a) the determined event associated with the first location and (b) a condition at a second location, the second location different than the first location; and
        determine that a second autonomous vehicle is traveling along a navigation path including the second location; and
    a communication device coupled to the processor, the communication device to transmit to the second autonomous vehicle signals corresponding to an instruction, based on the determined event, to cause sensor data collected by a second sensor of the second autonomous vehicle to be adjusted during navigation of the second autonomous vehicle through the second location.

15. The system of claim 14, wherein the control signal is generated to:
    (a) stop or slow the first autonomous vehicle;

(b) divert the first autonomous vehicle from the first location; or
(c) transfer control of the first autonomous vehicle to a user.

16. The system of claim 14, wherein the first sensor of the first autonomous vehicle includes at least one of a camera or a LiDAR sensor.

17. The system of claim 14, wherein the determined event includes at least one of:
   (i) a deviation above a threshold of a field of view of the first sensor;
   (ii) a lighting condition occurring in the field of view of the first sensor;
   (iii) a characteristic of the first location;
   (iv) a direction of navigation of the first autonomous vehicle; or
   (v) a time of day associated with the navigation of the first autonomous vehicle through the first location.

18. The system of claim 14, wherein the determined event includes a lighting condition of a surface in the first location, the lighting condition including at least one of a glare or a reflection.

19. The system of claim 18, wherein the instruction is to cause at least a portion of the sensor data collected by the second sensor of the second autonomous vehicle from the surface to be disregarded.

20. A non-transitory computer-readable medium having instructions stored thereon that, when executed by one or more computer processors, cause the one or more computer processors to perform operations comprising:
   receiving sensor data collected by a first sensor of a first autonomous vehicle during navigation of the first autonomous vehicle through a first location, the sensor data collected prior to a control signal subsequently generated by a controller of the first autonomous vehicle;
   determining, based on the sensor data, an event associated with the first location that triggered the control signal;
   identifying an association between (a) the determined event associated with the first location and (b) a condition at a second location, the second location different than the first location;
   determining that a second autonomous vehicle is traveling along a navigation path including the second location; and
   transmitting to the second autonomous vehicle an instruction, based on the determined event, to cause sensor data collected by a second sensor of the second autonomous vehicle to be adjusted during navigation of the second autonomous vehicle through the second location.

\* \* \* \* \*